Dec. 13, 1938.  J. W. MYERS ET AL  2,140,479
ELECTRICALLY OPERATED COOKING APPARATUS
Filed Dec. 13, 1935  3 Sheets-Sheet 1
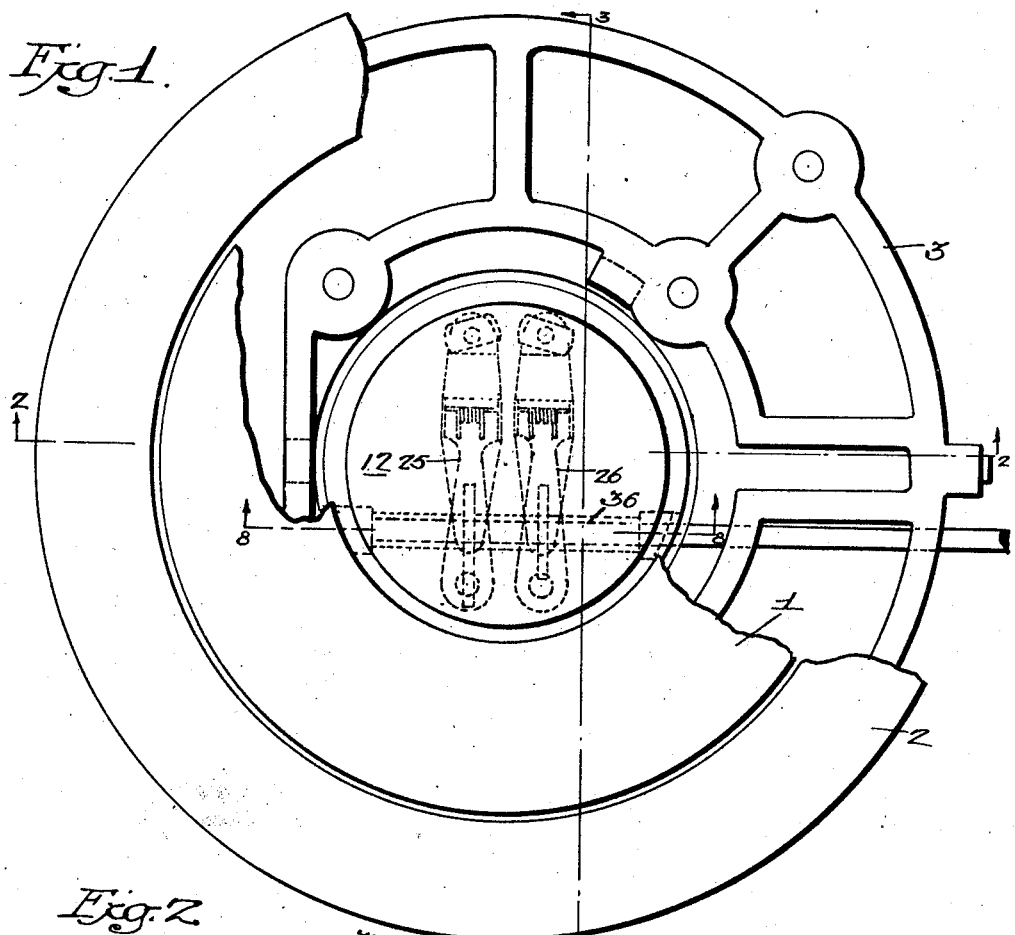
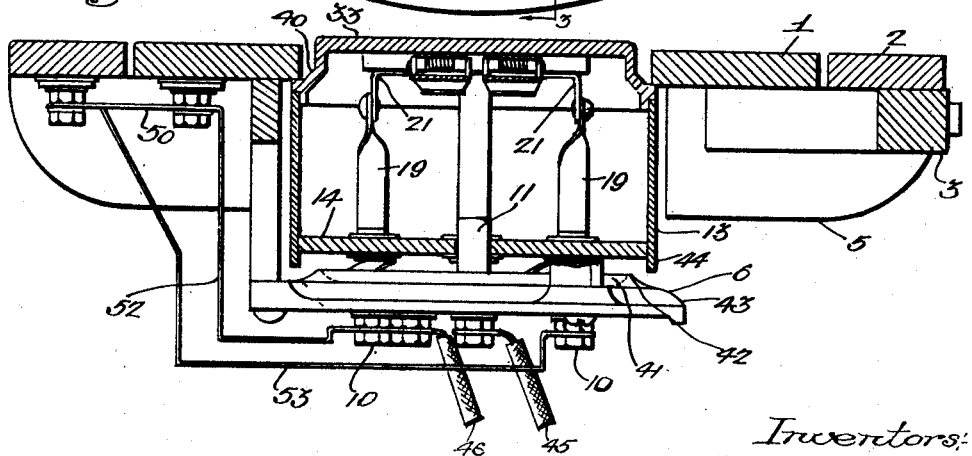
Inventors:
Joseph W. Myers
Stephen J. Roesch
by their Attorneys
Howson & Howson Dec. 13, 1938.   J. W. MYERS ET AL   2,140,479
ELECTRICALLY OPERATED COOKING APPARATUS
Filed Dec. 13, 1935   3 Sheets-Sheet 2
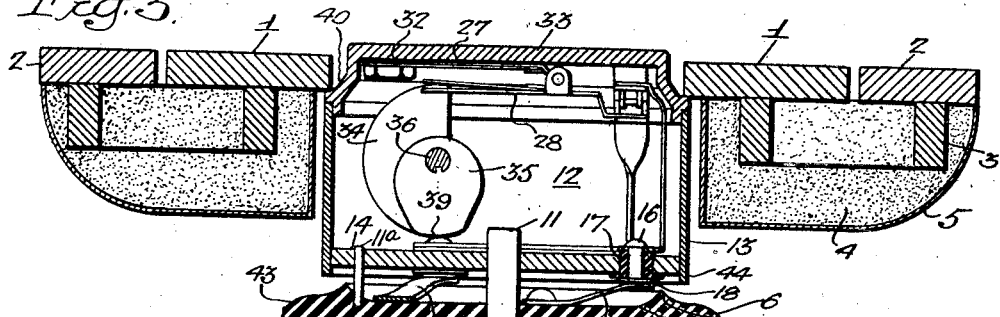
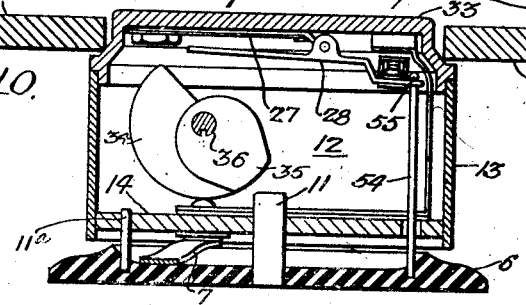
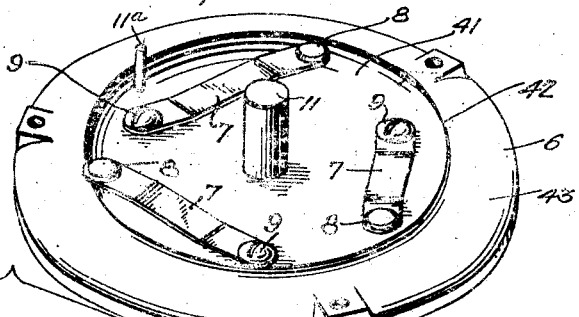
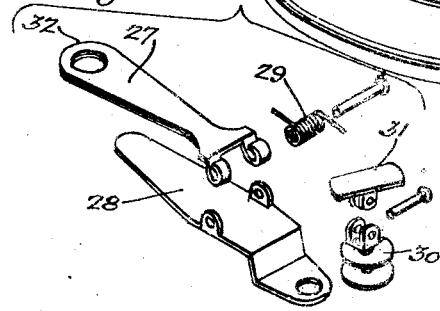
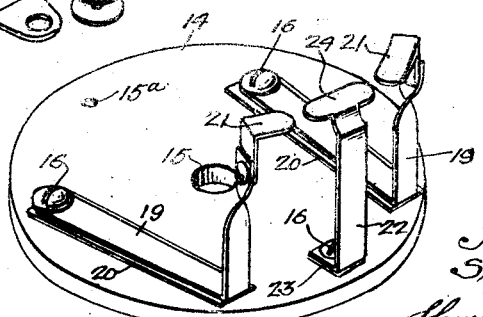
Inventors
Joseph W. Myers
Stephen J. Roesch
by their Attorneys
Howson & Howson Dec. 13, 1938.    J. W. MYERS ET AL    2,140,479
ELECTRICALLY OPERATED COOKING APPARATUS
Filed Dec. 13, 1935    3 Sheets-Sheet 3

Inventors
Joseph W. Myers
Stephen J. Roesch
by their Attorneys
Howson & Howson

Patented Dec. 13, 1938

2,140,479

UNITED STATES PATENT OFFICE 2,140,479

ELECTRICALLY OPERATED COOKING APPARATUS

Joseph W. Myers and Stephen J. Roesch, Philadelphia, Pa., assignors to said Joseph W. Myers Application December 13, 1935, Serial No. 54,341

13 Claims. (Cl. 219—37)

This invention relates to electrically operated cooking apparatus and has for its general object the provision of electrical cooking apparatus having the flexibility of gas-operated cooking apparatus with its large number of controllable "heats" or cooking temperatures.

Another object of the invention is to provide for control of the temperature of the material being cooked and, in the case of boiling, to prevent injury to the cooking vessel or to its contents in the event that the vessel boils dry. In such case, the temperature of the cooking vessel or its contents cannot rise sufficiently to injure the vessel or the contents.

A still further object of the invention is to prevent injury to the apparatus or material waste of electrical energy in the event that the apparatus is operated accidentally without a cooking vessel in place thereon. In such case, the apparatus automatically maintains itself at a temperature determined by the adjustment of the control device and very little electrical energy is consumed.

In accordance with the invention, there are provided two concentric annular electrical heating units, the smaller unit being adapted for cooking vessels of small diameter and both of the units being adapted for simultaneous operation where a cooking vessel of large diameter is used. A unitary thermostatically controlled device is resiliently mounted in the central space within the heating units and is engageable by a cooking vessel placed on the units so as to receive heat by thermal conduction from the vessel. The control device is further arranged so that it normally engages the inner heating unit and receives heat therefrom by thermal conduction in the absence of a cooking vessel and thus maintains a predetermined temperature of the heating units until the cooking operation is started. The control device is movable by the weight of a cooking vessel away from the heating units so as to receive heat from the cooking vessel only. The control device comprises thermostatic switches included respectively in the circuits of the heating units and adapted for control from a single control knob.

The invention makes possible the use of heating units which are insulated at their lower sides. It has been the practice heretofore to waste heat downward from the heating units as a safety measure to enable radiation of heat in the event of accidental misuse, thus guarding against excessive injurious temperature. The control provided by this invention, however, makes this unnecessary and enables the use of insulated enclosed type heating units, thereby materially increasing the efficiency of the apparatus.

Another feature of the invention resides in the arrangement of the thermostatic control unit so that it receives heat principally from a cooking pan or vessel but also receives heat from the heating unit or a corresponding heated part so that provision is made for simmering and boiling operation through a considerable range, as indicated on the control panel, when the thermostat is adjusted through the said range.

A further feature of the invention resides in the removable mounting of the control unit which eliminates manual electrical connections to the control unit, thereby greatly facilitating removal and replacement of the control device. Furthermore, the electrical terminals are located in spaced relation to the heating units so that the terminals are kept cool and trouble incident to hot terminals is eliminated.

The apparatus, and particularly the control device, is characterized by its simplicity of construction and economic manufacture. The adjusting mechanism of the control device embodies "off and on" control, thereby eliminating the usual control switches.

Other objects and features of the invention will be apparent hereinafter.

In the accompanying drawings:

Fig. 1 is a plan view of the apparatus with a portion of the heating units broken away for the sake of illustration;

Fig. 2 is a sectional view taken along line 2—2 of Fig. 1;

Fig. 3 is a sectional view taken along line 3—3 of Fig. 1;

Fig. 4 is a perspective view of the support and terminal plate for the control device;

Fig. 5 is an exploded perspective view of one of the thermostatic switch mechanisms;

Fig. 6 is a perspective view of the base and stationary contacts of the control device;

Fig. 10 is a fragmentary sectional view showing a modification.

Referring particularly to Figs. 1 to 3 of the drawings, there are provided concentric annular electrical heating units 1 and 2 of conventional form, which units are supported upon the frame 3. Preferably, the underside of the heating units is insulated by means of suitable insulating material 4 (see Fig. 3) enclosed within a casing or housing 5 provided for the purpose. This prevents dissipation and waste of heat downward from the heating units and materially increases the efficiency of the apparatus. Heretofore, it has been deemed necessary to waste heat downward so as to dissipate excessive heat and prevent injury to the apparatus in the event that a cooking vessel boiled dry or in any other instance where excessive temperature might be produced accidentally. The wasting of the heat downward served as a sort of "safety valve". By the use of the structure and control device described hereinafter, the downward wasting of heat becomes unnecessary and it is possible, therefore, to take advantage of the increase in efficiency obtained by insulation of the heating units.

Figure 7:
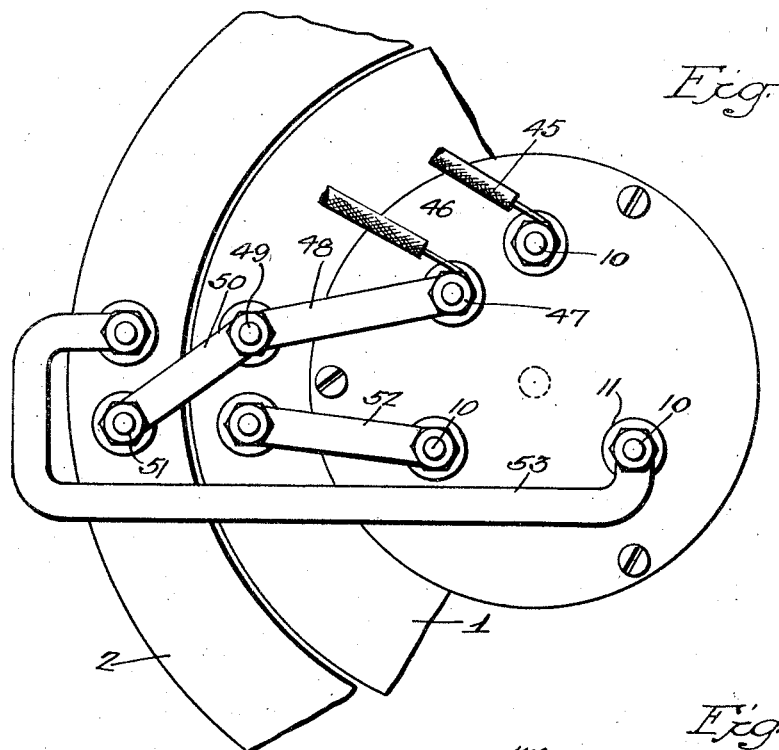
Fig. 7 is a partial inverted plan view of the apparatus showing the electrical connections.

A support and terminal plate 6 is removably attached to the supporting frame 3 below the central area and in spaced relation to the heating units. As shown more clearly in Fig. 4, the supporting plate 6 carries contact springs 7 having contacts 8 at their free ends. The springs are secured to the supporting plate by means of screws 9 passing through the plate to the underside thereof, as shown in Fig. 7, and providing terminals 10 for electrical conductors. The supporting plate 6 is preferably formed of insulating material so that the springs and terminals are insulated from one another and from the other parts of the apparatus. Positioning and guiding pins 11 and 11a are carried by the supporting plate 6, as shown clearly in Fig. 4.

The unitary control device is designated generally by reference character 12. This device comprises a casing 13 having a bottom 14 with apertures 15 and 15a (see Fig. 6) for the reception of the respective pins 11 and 11a. The bottom or base 14 of the control device carries contact screws 16 which extend through the base and as the base is preferably formed of metal, the screws are insulated from it by means of insulating bushings 17 (see Fig. 3). The locations of the screws 16 correspond respectively to the locations of the contacts 8. At the bottom end of the screws 16, there are provided contacts 18 which are adapted to be engaged by the contacts 8. The control device is supported solely by the resilient springs 7 which not only provide a resilient mounting for the control device but also serve as electrical conductors, as will be more clearly understood later. The pins 11 and 11a serve to maintain the control device in proper position and guide the said device in its resilient movement.

As shown in Fig. 6, two of the screws 16 serve to secure similar conductive strips 19 which are insulated from the base 14 by insulating strips 20. The upper ends of the strips 19 carry L-shaped contact members 21. The third screw 16 secures a conductive strip 22 to the base, which strip is likewise insulated from the base by the insulating member 23. The upper end of the conductive strip 22 is formed to provide a contact 24 which is interposed between the contacts 21 and positioned in predetermined spaced relation with respect thereto.

The control device further comprises a pair of thermostatic switches (see Fig. 1) designated respectively 25 and 26, which switches are adapted to control the respective heating units, as will be more clearly understood later. As will be more clearly understood from Fig. 5, each of the thermostatic switches comprises a heat-responsive element 27 which may take the form of a bi-metallic strip, a lever 28 pivotally carried at the free end of element 27 and urged in one direction by a spring 29, a contact-supporting member 30 carried at one end of the lever 28, and a contact member 31 pivotally carried by the supporting member 30. The contact members 31 are adapted respectively to bridge the gaps between the central stationary contact 24 and the outer stationary contacts 21. By virtue of the pivotal mounting of the contact members 31, good electrical contact with the stationary contacts is insured.

As shown in Fig. 3, the heat-responsive element 27 of each switch has its end 32 secured to the top 33 of the control device. As the top 33 is formed of a heat-conducting material, such as metal, it will be seen that heat may be conducted through the top to the heat-responsive members 27. The contact members 31 are adapted to engage the undersides or surfaces of the stationary contacts 21 and 24. The springs 29 urge the levers 28 in a counter-clockwise direction, as viewed in Fig. 3, thereby tending to maintain the contact members 31 in engagement with the stationary contacts.

Figure 8:
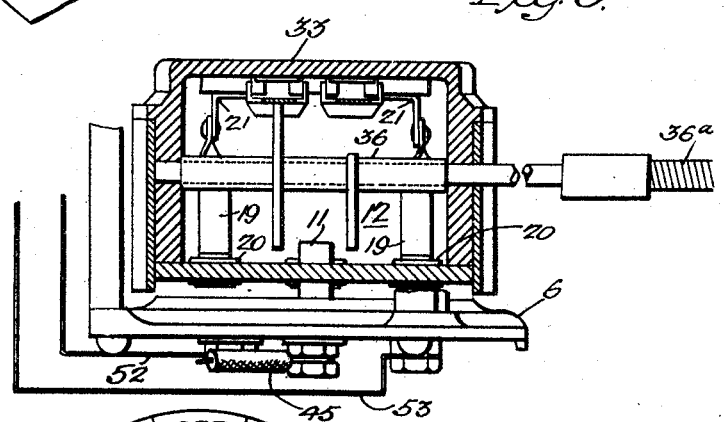
Fig. 8 is a fragmentary section taken along line 8—8 of Fig. 1.

The thermostatic switch 25 is adapted to control the outer heating unit, while the thermostatic switch 26 is adapted to control the inner heating unit. A cam 34 (see Fig. 3) is cooperatively associated with the free end of the lever 28 of switch 25, while a second cam 35 is cooperatively associated with the corresponding lever of switch 26. These cams are adapted to control the operation of their respective thermostatic switches. It will be seen from Fig. 3 that the position of either of the cams will determine the operation of the associated thermostatic switch. By varying the position of the lever 28, the associated cam may vary the amount of flexing movement of the heat-responsive member 27 necessary to open the switch contacts or it may open the switch contacts completely, thereby rendering the thermostatic switch inoperative. The cams are designed so that the inner heating unit may be used alone in case a cooking vessel of small diameter is to be used or the two heating units may be used conjointly when it is desired to use a cooking vessel of large diameter. The cams are carried upon the rotatable shaft 36 which extends externally of the casing of the control device and is adapted to have removably connected to it a flexible shaft 36a (see Fig. 8) leading to the control knob 37 (see Fig. 9) which may be located remotely on any part of the cooking apparatus. For example, when the apparatus is embodied in an electrical range, the control panel 38 and the control knob associated therewith may be located in any convenient position.

As indicated by the legends on the control panel 38, the vertical upward position of the indicating control knob corresponds to the "off" or inoperative condition of both heating units. Rotation of the control knob toward the left, or in a counter-clockwise direction, serves to energize the inner or center heating unit only and serves to adjust the thermostatic switch of that unit for various cooking operations requiring different temperatures as indicated. Rotation of the control knob to the right, or clockwise, however, serves to energize both of the heating units and serves to adjust the thermostatic switches conjointly, thereby adapting both of the heating units for operation at a desired temperature for a particular cooking operation, such as indicated. The cams 34 and 35 are designed to effect this mode of operation. The cams have a common high point 39 which, when brought into engagement with the levers 28, serves to open both of the thermostatic switches in response to positioning of the indicator knob 37 at its "off" position. With the cams in the "off" position, if the cams are rotated counter-clockwise, as viewed in Fig. 3, from the off position, the cam 35 allows closing of its associated thermostatic switch which controls the inner or center heating unit and the position of the cam determines the temperature at which the switch will operate. The cam 34, however, is designed to maintain its associated thermostatic switch, which controls the outer heating unit, in opened condition. If, however, the cams are rotated clockwise, as viewed in Fig. 3, from their common off position, both of the cams allow their associated thermostatic switches to close and the position of the cams in any instance determines the temperature at which the switches will open.

It will be seen that the supporting springs 7 serve to urge the control device upward and the metallic top of the control device is formed as illustrated clearly in Figs. 2 and 3 to provide an annular shoulder 40 which abuts against the lower surface of the inner heating unit when the control device is in uppermost position. In the absence of a cooking vessel, the control device is, therefore, in thermal-conducting relation with the inner heating unit and heat is conducted thermally from the unit through the top 33 to the heat-responsive member 27. Therefore, if the apparatus is turned on in the absence of a cooking vessel, either intentionally or accidentally, the heating unit is allowed to rise in temperature only to a predetermined temperature and is maintained at that temperature by the control device. Thus, the apparatus is ready for immediate cooking and at the same time very little electrical energy is consumed in the maintenance of the said predetermined temperature. This feature is important not only in its safeguarding of the apparatus in the event that the apparatus is accidentally turned on but it also enables the rapid heating of the apparatus to a predetermined temperature at which a particular cooking operation should take place.

When a cooking vessel is placed upon the cooking surface of the heating units, the bottom of the vessel engages the top surface of the control device and the weight of the vessel moves the control device downward against the action of the supporting springs 7. Thus, the top surface of the control device is maintained in engagement with the bottom surface of the cooking vessel so that heat is conducted from the bottom of the vessel to the heat-responsive members 27 as above mentioned. The downward movement of the control device under the weight of the vessel causes the annular shoulder 40 to move away from the inner heating unit, thus interrupting the heat-conducting path from the heating unit to the control device and causing the control device to respond principally to the temperature of the cooking vessel, but the control device is still affected by heat transferred from the heating unit by radiation and convection.

Figure 9:
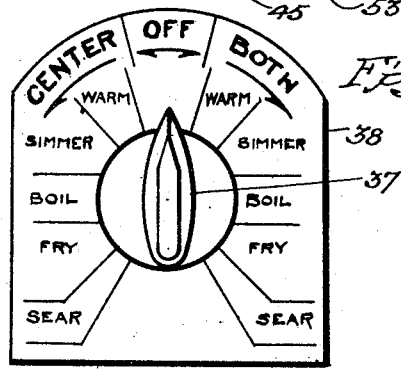
Fig. 9 is a face view of the control panel.

It will be seen from Figs. 2 and 3 that when the control device is depressed, the top 33 is in proximity to the heating unit 1 and the casing 13 is likewise in proximity to the casing 5. Therefore the parts 33 and 13 receive heat by radiation and convection from the parts 1 and 5, particularly since the cooking vessel closes the top of the annular space between the control device and the heating unit. The transfer of heat to the control device from both the cooking vessel and the heating unit enables the device to perform simmering and boiling operations through a considerable range of adjustment, as indicated in Fig. 9. This operation is comparable to the range of simmering and boiling operations obtained in the use of a gas range by varying the height of the gas flame.

To explain this more fully, it will be apparent that if the cooking vessel is filled with water, the bottom of the vessel where it contacts the control device will rise in temperature to approximately 212° F. and will remain at that temperature during the boiling of the water. Obviously, therefore, the bottom of the cooking vessel cannot control the thermostatic device for different degrees of boiling, and were it not for the fact that the thermostatic device receives heat from the heating unit, it would be impossible to obtain thermostatic control over a substantial range of simmering and boiling, since the thermostatic device would be affected by one temperature only. But since the control device receives heat from the heating unit, it is effective to control the operation over a substantial range of simmering and boiling, as indicated in Fig. 9. Thus the user has at his disposal a selection of simmering and boiling heat outputs capable of producing ebullition of varying degrees, despite the fact that there is substantially no detectable or useful temperature difference in the vessel where it is contacted by the control device or in its watery contents.

After the vessel and its contents have reached 212° F. and the vessel is, therefore, incapable of further raising the temperature of the control thermostat, the thermostat will continue to receive heat from the heating unit and may rise in temperature until a point is reached at which the thermostat gives off heat to the bottom of the cooking vessel as fast as it is received from the heating unit. If the setting of the thermostat is set slightly higher than this point it will not open to cut off the current until all water has boiled from the vessel. If the setting is slightly lower than this point the water will boil violently under the full input of the heating unit, but the thermostat will eventually open due to its continuing to receive heat from the heating unit. However, as soon as it cuts off the current to the unit, the unit temperature will quickly fall and the thermostat will tend to cool to the true temperature of the vessel and, as a result, will soon turn on the current and a considerable period of full heat will again follow, terminated by a brief "off" period. It will be seen, however, that as the temperature setting of the thermostat is reduced by turning the knob 37 lower toward "simmer", the length of the "on" periods will be shortened and the "off" periods will be longer. Thus, the violence of ebullition diminishes until the thermostat is receiving only enough heat from the unit and vessel to produce a very slow simmer with little or no ebullition.

The supporting plate 6 is preferably formed so as to provide a recessed area 41 within which the springs 7 are mounted, the said area being defined by an annular ridge 42, and the annular edge portion of the plate is formed as clearly illustrated in Fig. 3 to provide an apron 43. The casing of the control device is also provided with a depending apron portion 44 arranged cooperatively with the apron 43 of the supporting plate.

The purpose of this structure is to prevent material which may be spilled during the cooking operation from coming in contact with the supporting springs and the electrical contacts. It will be seen that any material which is spilled will run down the side wall of the casing of the control device onto the apron 43 and over the edge of this apron. The ridge 42 prevents any spilled material from getting into the recessed area 41.

The electrical connections are shown more clearly in Figs. 2 and 7. An electrical supply conductor 45 is connected to the terminal 18 to which the center switch contact 24 is connected. Another supply conductor 46 is connected to an auxiliary terminal 47 provided on the underside of the supporting plate 6. This auxiliary terminal is connected by the conductive link or element 48 to a terminal 49 of the inner heating unit. The terminal 49 is, in turn, connected by the conductive link 50 to a terminal 51 of the outer heating unit. The other terminals of the heating units are connected respectively by conductive links 52 and 53 to the terminals 18 which are connected to the switch contacts 21.

It will be seen that two parallel branch circuits are provided which include respectively the heating units and their associated control switches, the conductive strip 22 constituting a common return lead for the two branch circuits. Thus, the main circuit of the device includes supply conductor 46, conductive link 48, the two parallel branch circuits above mentioned, the common return elements 22, and the supply conductor 45. One of the parallel branch circuits includes the inner heating unit, the conductive link 52, one of the conductive strips 19, the associated switch contact 21, and the contact 31 of the associated control switch. The other branch circuit includes the conductive link 50, the outer heating unit, the conductive link 53, the other of the conductive strips 19, the associated contact 21 and the contact 31 of the associated switch. It will be seen that there are three legs of the circuit extending from the supporting plate 6 to the control switches, two of these legs being included respectively in the parallel branch circuits and the third leg constituting a common return for the branch circuits. The springs 7 are included respectively in the three circuit legs. When the removable unitary control device is positioned properly on the supporting springs 7, the three circuit legs are automatically completed and the thermostatic control switches are included properly in circuit with the heating units.

In Fig. 10, there is illustrated a modified form of the control device wherein the control switches are automatically opened in the absence of a cooking vessel. To this end, the contact-carrying ends of the levers 28 have associated therewith fixed rods 54 which are carried by the supporting plate 6 and extend through openings in the bottom of the casing of the control device. The upper ends of the rods 54 have stop portions 55 which serve to open the switch contacts when the control device moves upward in response to removal of a cooking vessel. Thus, both of the control switches are automatically opened when the cooking vessel is removed. While this feature may be desired in some cases, it is generally desirable to control the heating of the heating units so as to maintain a predetermined temperature in the absence of a cooking utensil, as above described in connection with the preferred form of the apparatus.

It will be apparent from the illustration and the above description that the apparatus provided by the invention embodies the several desirable features above mentioned. It will also be seen that the novel control device, in combination with concentric annular heating units, enables extreme flexibility of control similar to that which obtains in gas-operated apparatus. Furthermore, such control is effected from a single point and by means of a single control knob. This, together with the other salient features, renders the apparatus a marked improvement over prior devices of the same general type. It will be understood, of course, that the invention is not limited to the specfic forms herein described but is capable of modification without departure from the inventive principles.

We claim:

1. In an electrically operated cooking apparatus, an electrical heating unit having a heating surface adapted to receive a cooking vessel, and a thermostatic control device resiliently mounted in cooperative relation with said heating unit and adapted to engage said heating unit in the absence of a cooking vessel thereon, so as to receive heat by thermal conduction from said heating unit, said control device being engageable by a cooking vessel placed on said surface and movable by the weight of the vessel away from said heating unit, so as to receive heat by thermal conduction from said vessel, said control device comprising a thermostatic switch in circuit with said heating unit for controlling the same.

2. In an electrically operated cooking apparatus, an annular electrical heating unit having an annular heating surface adapted to receive a cooking vessel, and a unitary thermostatic control device resiliently mounted in the central space within said heating unit and adapted to engage said heating unit in the absence of a cooking vessel thereon, so as to receive heat by thermal conduction from said heating unit, said control device being engageable by a cooking vessel placed on said surface and movable by the weight of the vessel away from said heating unit, so as to receive heat by thermal conduction from said vessel, said control device comprising a thermostatic switch in circuit with said heating unit for controlling the same.

3. In an electrically operated cooking apparatus, a pair of concentric annular electrical heating units each having an annular heating surface adapted to receive a cooking vessel, and a thermostatic control device resiliently mounted in the central space within said heating units and engageable by a cooking vessel placed on one or both of said surfaces, so as to receive heat by thermal conduction from said vessel, said control device comprising a pair of thermostatic switches in circuit respectively with said heating units for controlling the same, and means for selectively rendering one or both of said switches operative, and for adjusting one or both of said switches for operation at one of several predetermined temperatures.

4. In an electrically operated cooking apparatus, a pair of concentric annular electrical heating units each having an annular heating surface adapted to receive a cooking vessel, and a unitary thermostatic control device resiliently mounted in the central space within said heating units and engageable by a cooking vessel placed on one or both of said surfaces, so as to receive heat by thermal conduction from said vessel, said control device comprising a pair of thermostatic switches in circuit respectively with said heating units for controlling the same, and means actuatable by a single control member for selectively rendering one or both of said switches operative, and for adjusting one or both of said switches for operation at one of several predetermined temperatures.

5. In an electrically operated cooking apparatus, a pair of concentric annular electrical heating units each having an annular heating surface adapted to receive a cooking vessel, and a thermostatic control device resiliently mounted in the central space within said heating units and engageable by a cooking vessel placed on one or both of said surfaces, so as to receive heat by thermal conduction from said vessel, said control device comprising a pair of thermostatic switches in circuit respectively with said heating units for controlling the same, a single control member having an "off" position and two similar adjustment ranges, one for controlling one of said switches and the other for controlling both of said switches simultaneously, and means operable by said control member for rendering both of said switches inoperative when said member is in its "off" position, and for rendering one or both of said switches operative and for adjusting the operative switch or switches for operation at one of several predetermined temperatures when said member is adjusted in one or the other of its said adjustment ranges.

6. In an electrically operated cooking apparatus, an electrical heating unit, a removable unitary thermostatic control device for controlling said heating unit, and means for removably supporting said control device and for including it in electrical circuit with said heating unit free of manual electrical connection to said control device, said means including a support member having electrical connections thereto and resilient spring members adapted to support said control device and to serve as electrical conductors, said control device and said support member having cooperative peripheral drip aprons protecting said spring members and said electrical connections.

7. In an electrically operated cooking apparatus, an electrical heating unit having a heating surface adapted to receive a cooking vessel, and a thermostatic control device resiliently mounted in cooperative relation with said heating unit and engageable by a cooking vessel placed on said surface, so as to receive heat by thermal conduction from said vessel, said control device comprising a thermostatic switch in circuit with said heating unit for controlling the same, and means rendered operative by the removal of said vessel for opening said switch in response to movement upward of said control device.

8. In an electrically operated cooking apparatus, an annular electrical heating unit having an annular heating surface adapted to receive a cooking vessel, and a unitary thermostatic control device resiliently mounted in the central space within said heating unit and engageable by a cooking vessel placed on said surface, so as to receive heat by thermal conduction from said vessel, said control device comprising a thermostatic switch in circuit with said heating unit for controlling the same, and means rendered operative by the removal of said vessel for opening said switch in response to movement upward of said control device.

9. In an electrically operated cooking apparatus, a pair of concentric annular electric heating units adapted to receive a cooking vessel on the inner one or both of said units, and a thermostatic control device resiliently mounted in the central space within said heating units and engageable by a cooking vessel placed on the unit surfaces so as to receive heat by thermal conduction from said vessel, said control device comprising thermostatic switching means for selectively rendering the inner one or both of said heating units active and subject to said thermostatic control at a predetermined temperature of said vessel.

10. In an electrically operated cooking apparatus, an annular electrical surface cooking unit, a unitary thermostatic control device for said unit resiliently mounted within the annulus and having terminal contacts on its bottom, a common supporting frame for said unit and said control device, and resilient contact members supported by said stationary frame and adapted to seat said terminal contacts, to thus resiliently support said control device and to include it in circuit with said cooking unit.

11. In an electrically operated cooking apparatus, an electrical heating unit, an electrical circuit for energizing said unit, an adjustable thermostatic control device constructed and arranged to receive heat principally by thermal conduction from a cooking vessel placed on said heating unit but also effectively by radiation and convection from a heated part of the apparatus, said control device comprising a thermostatic switch in circuit with said heating unit, and manually operable means for adjusting said control device for operation over a relatively wide temperature range including a substantial range of simmering and boiling operation, whereby said control device is adapted, by its receiving heat as aforesaid and by its adjustment, to effect and control varying degrees of ebullition of the contents of said vessel.

12. In an electrically operated cooking apparatus, an annular electrical heating unit, an electrical circuit for energizing said unit, an adjustable thermostatic control device resiliently mounted in the central space within said heating unit in close proximity to the unit and engageable by a cooking vessel placed on said heating unit, so that said control device receives heat principally by thermal conduction from said vessel but also effectively by radiation and convection from said heating unit, said control device comprising a thermostatic switch in circuit with said heating unit, and manually operable means for adjusting said control device for operation over a relatively wide temperature range including a substantial range of simmering and boiling operation, whereby said control device is adapted, by its receiving heat as aforesaid and by its adjustment, to effect and control varying degrees of ebullition of the contents of said vessel.

13. In an electrically operated cooking apparatus, an annular electrical heating unit, an electrical circuit for energizing said unit, means for insulating the lower surface of said heating unit to prevent downward transfer of heat therefrom, an adjustable thermostatic control device resiliently mounted in the central space within said heating unit in close proximity to the unit and engageable by a cooking vessel placed on said heating unit, so that said control device receives heat principally by thermal conduction from said vessel but also effectively by radiation and convection from said heating unit, said control device comprising a thermostatic switch in circuit with said heating unit, and manually operable means for adjusting said control device for operation over a relatively wide temperature range including a substantial range of simmering and boiling operation, whereby said control device is adapted, by its receiving heat as aforesaid and by its adjustment, to effect and control varying degrees of ebullition of the contents of said vessel.

JOSEPH W. MYERS.
STEPHEN J. ROESCH.